United States Patent
Jernigan, IV

(10) Patent No.: US 10,002,055 B2
(45) Date of Patent: Jun. 19, 2018

(54) EFFICIENT REPAIR OF B+ TREE DATABASES WITH VARIABLE-LENGTH RECORDS

(71) Applicant: NetApp, Inc., Sunnyvale, CA (US)

(72) Inventor: Richard P. Jernigan, IV, Sewickley, PA (US)

(73) Assignee: NETAPP, INC., Sunnyvale, CA (US)

( * ) Notice: Subject to any disclaimer, the term of this patent is extended or adjusted under 35 U.S.C. 154(b) by 123 days.

(21) Appl. No.: 15/142,850

(22) Filed: Apr. 29, 2016

(65) Prior Publication Data
US 2017/0315881 A1    Nov. 2, 2017

(51) Int. Cl.
   *G06F 11/00* (2006.01)
   *G06F 11/14* (2006.01)
(52) U.S. Cl.
   CPC ...... *G06F 11/1471* (2013.01); *G06F 2201/80* (2013.01); *G06F 2201/805* (2013.01)
(58) Field of Classification Search
   CPC .................................................. G06F 11/1471
   See application file for complete search history.

(56) References Cited

U.S. PATENT DOCUMENTS

| | | | | |
|---|---|---|---|---|
| 6,105,062 A * | 8/2000 | Andrews | ........... | G06F 17/30961 707/999.01 |
| 6,591,269 B1 * | 7/2003 | Ponnekanti | ....... | G06F 17/30327 |
| 7,363,284 B1 * | 4/2008 | Plasek | ............... | G06F 17/30327 |
| 7,941,451 B1 * | 5/2011 | Ritchie | ............ | G06F 17/30327 707/797 |
| 8,843,472 B2 * | 9/2014 | Katz | ................. | G06F 17/30303 707/711 |
| 9,149,054 B2 * | 10/2015 | Manner | ................ | A23G 1/0066 |
| 9,454,550 B2 * | 9/2016 | Choi | ................. | G06F 17/30958 |
| 2005/0171960 A1 * | 8/2005 | Lomet | ............... | G06F 17/30327 |
| 2005/0193035 A1 * | 9/2005 | Byrne | ................. | G06F 11/1471 |
| 2006/0047694 A1 * | 3/2006 | Anderson | ........... | G06F 11/1448 |
| 2011/0035359 A1 * | 2/2011 | Bendakovsky | ..... | G06F 11/1458 707/640 |
| 2011/0252067 A1 * | 10/2011 | Marathe | ........... | G06F 17/30958 707/797 |
| 2013/0091110 A1 * | 4/2013 | Katz | ................. | G06F 17/30303 707/696 |
| 2014/0324782 A1 * | 10/2014 | Graefe | ................ | G06F 11/1451 707/646 |
| 2016/0283537 A1 * | 9/2016 | Chen | ................. | G06F 17/30327 |
| 2017/0212902 A1 * | 7/2017 | Graefe | ............. | G06F 17/30073 |

* cited by examiner

*Primary Examiner* — Christopher S McCarthy
(74) *Attorney, Agent, or Firm* — Klein, O'Neill & Singh, LLP

(57) ABSTRACT

Presented herein are methods, non-transitory computer readable media, and devices for efficiently repairing tree databases with variable-length records. Methods for repairing tree databases with variable-length records are disclosed which include: iterating the tree database, detecting at least one recoverable leaf block, reducing the at least one recoverable leaf block to its legally formatted contents, and writing the at least one recoverable leaf block back into the tree database; processing the at least one recoverable leaf block to ensure the at least one recoverable leaf block represents a disjoint region within a record space within the tree database; and rebuilding branch blocks as necessary to provide a lookup and organizational index for the at least one recoverable leaf block.

15 Claims, 9 Drawing Sheets

EFFICIENT REPAIR OF B+ TREE DATABASES WITH VARIABLE-LENGTH RECORDS

TECHNICAL FIELD

The present disclosure relates generally to mass data storage networks and data storage filing systems. More particularly, aspects of this disclosure relate to methods, non-transitory computer readable media, and devices for efficiently repairing tree databases with variable-length records.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual environments where a physical resource is time-shared among a plurality of independently operating processor executable virtual machines. Typically, storage space is presented to a virtual machine as a virtual hard disk (VHD) file. A storage drive (for example, C:\) is then presented to a client via a user interface within a virtual machine context. The client can use the storage drive to access storage space to read and write information.

Cloud computing with virtual machines is becoming popular today. Cloud computing means computing capability that provides an abstraction between a computing resource and its underlying technical architecture (e.g., servers, storage, networks), enabling convenient, on-demand network access to a shared pool of configurable computing resources that can be rapidly provisioned and released with minimal management effort or service provider interaction.

In the cloud computing environment, storage space is made available to clients by a cloud provider for storing information via a file system, which is software that keeps track of all of the data stored and manages read/write operations on the data. The term "file system" can also be used to refer to the actual structure of the stored data. The files within the file system are generally stored within a hierarchy of directories. A directory is simply a software-based entity which can contain information, such as one or more files, other directories and/or other data, and which is used to organize stored information.

Despite the overall improvement in the reliability of data storage systems, particularly in cloud computing, they sometimes fail and it remains necessary to implement methods to repair said data systems. In a typical system, a backup agent executing on a primary computer system creates a copy of the data system to a secondary computer system where it is stored. Accordingly, if data loss occurs or specific data fails at the primary system, the data system is completely rebuilt, block-by-block based on the legal rules of the data system until the data loss or failed data is located, localized and repaired. This is a common technique that ensures all the data located in the initial failed data structure are inserted into the new data structure correctly formatted based on the legal rules used to insert the data. However, where the damage is relatively small, i.e. a block that cannot be loaded, or a bug exists in the code that causes a record to be inserted in the wrong place, completely replacing the entire data system is an ineloquent and excessive response that requires a large amount of disk read operations ("I/O") and unnecessarily consumes time and resources.

The present disclosure is susceptible of various modifications and alternative forms, and is not limited to the embodiments and aspects presented herein by way of example only and described with reference to the accompanying drawings.

DETAILED DESCRIPTION OF ILLUSTRATED EXAMPLES

The present disclosure is directed to a system and method for efficiently repairing tree databases with variable-length records. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

A common data structure includes a B+ tree data structure. The B+ tree data structure is a self-balancing tree data structure that keeps data sorted and allows searches, sequential access, insertions, and deletions in logarithmic time. Therefore, the records in a B+ tree are automatically maintained in a sorted fashion continuously, and can be easily enumerated in sorted order. Furthermore, the B+ tree's indexing method allows a caller to quickly search the tree to find a particular record. The B+ tree is a generalization of a binary search tree in that a node can have more than two children. Unlike self-balancing binary search trees, the B+ tree is optimized for systems that read and write large blocks of data. In addition, the B+ tree is a very common data structure that encapsulates a potentially large number of fixed-length records.

Figure 1:
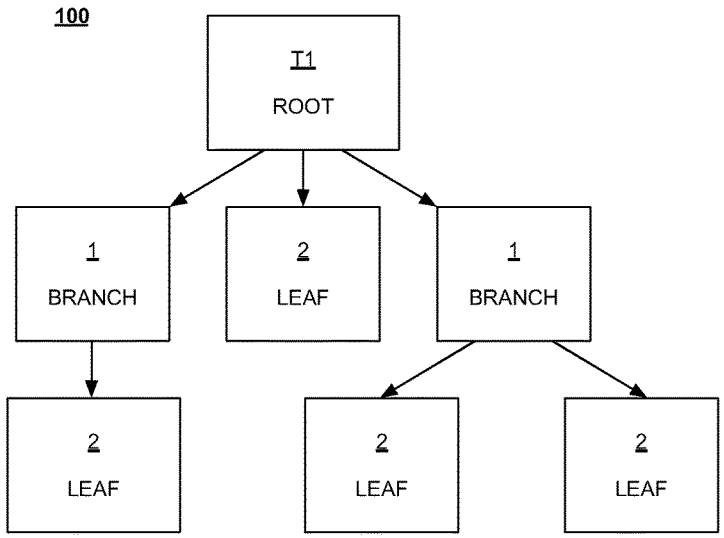
FIG. 1 is a schematic block diagram of an exemplary file system B+ tree structure of a storage system.

The B+ tree is organized as a series of fixed-length storage blocks, where each storage block is either a leaf block or a branch block. An exemplary file system B+ tree structure 100 is shown in FIG. 1. One of the blocks is denoted as the root T1: if the tree 100 contains only a single block, then this is considered as the root T1, or if there is more than one leaf block 2 then there must also be at least one branch and one of those branches serves as the root T1. All records within the B+ tree are stored within the leaf blocks 2, while branch blocks 1 provide a hierarchy of indexing structures to help search and organize the leaf blocks 2. As records are added, existing leaf blocks 2 begin to fill up, until one reaches its capacity. Once this occurs, a full leaf is split into two and an additional branching structure is added to keep the new blocks organized. Accordingly, as records are removed leaf blocks 2 begin to lose records, until one reaches its minimum allowable capacity. Once this occurs, that block is then merged with a sibling and the branching structure above is reduced to comply. B+ tree organization is a common choice for persistent data storage because it performs well with fixed-size storage blocks. Since B+ trees require fixed-length records, the fan-out (not shown) of a B+ tree, the number of pointers per block, is defined as block capacity divided by record size. The fan-out becomes a critical property of the B+ tree, used to define how a B+ tree is organized legally. For example, a B+ leaf must maintain at least half the fan-out records, and if a record is removed the leaf block must be merged with its sibling. Because B+ trees are defined by this fixed-fan-out property, it can be difficult to make them work efficiently with variable-length records.

It is desirable to efficiently repair tree databases with variable-length records. As explained above, a B+ tree is a common data structure that encapsulates a potentially large number of fixed-length records. Because B+ trees are defined by this fixed-fan-out property, it can be difficult to make them work efficiently with variable-length records. A common way to accomplish this is to store the records in a separate heap space and have the B+ tree's fixed-length records merely be pointers into the heap space. However, traversing a B+-and-heap combination is an extremely large amount of disk read ("I/O") process, requiring frequent and random access to the heap space—yielding poor performance for searches. With this disclosure, data structures are provided with variable-length records, storing those records inline within the branch and leaf blocks themselves rather than storing the records in an external heap.

A variable-length tree is a variant of the well-known B+ tree, supporting variable-length records and therefore variable fan-out throughout the tree. The maximum size of a record is capped such that any block in the variable-length tree must be able to contain at least two maximum-length records—but no other limitations for record length appear. Because the records in the variable-length tree can be of different sizes, there is no way to compute or mandate a fixed fan-out for the tree, which means it is not confined to the usual B+ organization rules. Otherwise, the variable-length tree shares some common traits of the well-known B+ tree. For example, a variable-length tree holds all its records in leaf blocks, duplicate records are not allowed, the records within each leaf block are kept in internally sorted order, and the range of records within each leaf block is disjoint from the range of every other leaf block. Therefore, one can iterate the full range of records in sorted order by identifying the first leaf block and traversing its in-order records, then by identifying the next leaf block and traversing its in-order records, and so on.

Aspects of this disclosure are directed to methods, non-transitory computer readable media, and devices for efficiently repairing tree databases with variable-length records. For example, even a severely corrupted variable-length tree can be efficiently recovered, and performance improves substantially for databases that are less corrupt. When a database is used to hold important data, it is imperative to have a mechanism by which it can be recovered if corrupted. Some data (such as the records that were explicitly overwritten with garbage or that cannot be read) may be irrecoverably lost; this is unavoidable without additional redundancy. Lacking that redundancy, the goal of a repair mechanism is to recover as much data as possible, ensuring that when complete the database contains only the records that were able to be extracted from the previously damaged variable-length tree, and the database now indexes those recovered records legally according to the tree's rules. Further, these repairs are performed as efficiently as possible. Therefore, completely replacing the entire data system as is typical with repairing a B+ tree system becomes unnecessary, and is impractical when databases grow to very large sizes. Furthermore, an extended outage in accessing a mass of important data would be a significant problem for the database's owner.

In an embodiment of the present disclosure, a process iterates once through the existing variable-length tree database block by block, detecting recoverable leaf blocks, reducing each one to only its legally formatted contents, and writing them back. During this phase, all branch blocks are removed from the database. Afterwards, the recovered leaf blocks are processed to ensure that each leaf block represents a disjoint region within the record space. This processing can involve splitting some leaf blocks; such that the number of leaf blocks overall might grow. Finally, the repair process rebuilds branch blocks as necessary to provide a lookup and organizational index for the recovered leaf blocks. The repair process described here works efficiently for variable-length trees. It can be used for B+ trees as well, but the resulting trees would potentially not be legally formatted (since some blocks might have too many or too few records for strict B+ constraints). This can be addressed either through additional post-repair processing, or by relaxing the constraints about how a legal B+ tree must be formatted. In other words, completely replacing the entire data system as is typical with repairing a B+ tree system is not required.

Figure 2A:
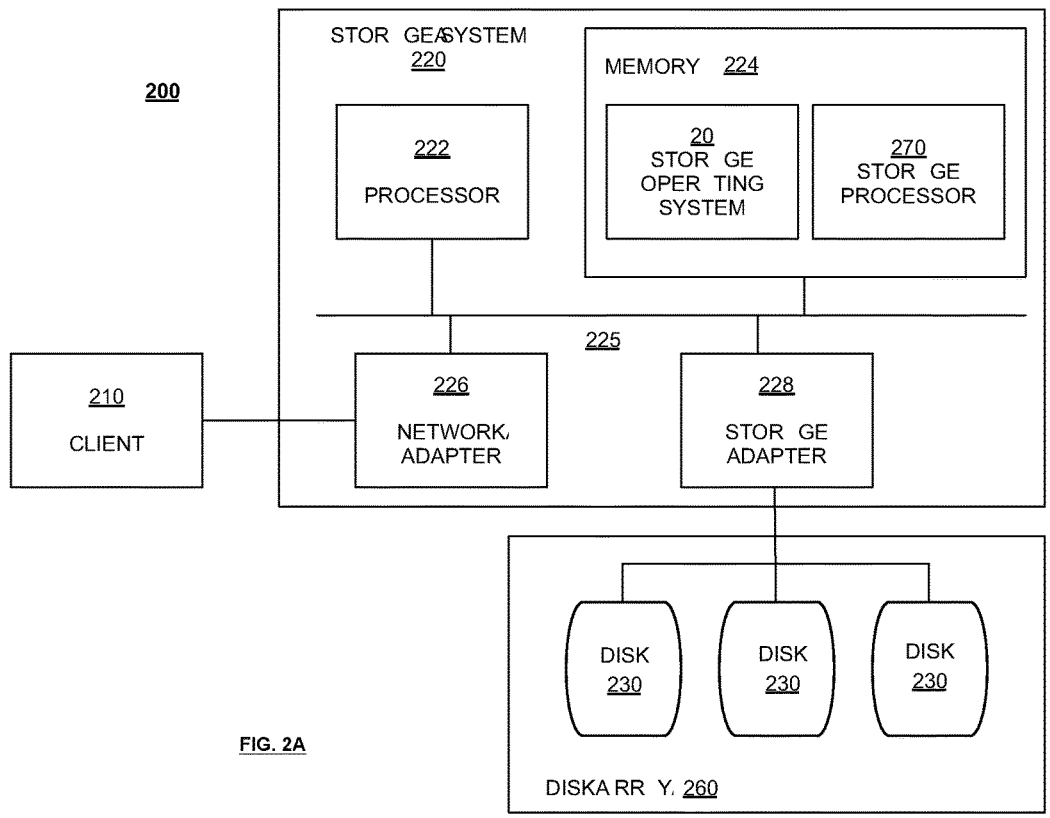
FIG. 2A is a schematic block diagram of an environment including a storage system that may be added advantageously used with the present disclosure.

FIG. 2A is a schematic block diagram of a storage system environment 200 including a storage system 220 that may be advantageously used in accordance with an illustrative embodiment of the present disclosure. The storage system 220 is a computer that provides storage service relating to the organization of information on storage devices, such as disks 230 of a disk array 260. The disk array 260 can include all traditional hard drives, all flash drives, or a combination thereof. The storage system 220 comprises a processor 222, a memory 224, a network adapter 226 connected to client 210 and a storage adapter 228 interconnected by a system bus 225. The storage system 220 also includes a storage operating system 20 that illustratively implements a high-level module, such as a file system, to logically organize the information as a hierarchical structure of data containers, such as directories, files, and special types of files called virtual disks (hereinafter "blocks") on the disks. A portion of the memory may include a storage processor 270 for efficiently repairing tree databases stored within the storage operating system 20. In certain embodiments, storage processor 270 may be omitted. In an illustrative embodiment, the storage operating system 20 comprises a tree database with variable-length records as described above. In an alternative embodiment, the storage system 220 comprises a B+ tree database with fixed-length records as described above.

Figure 2B:
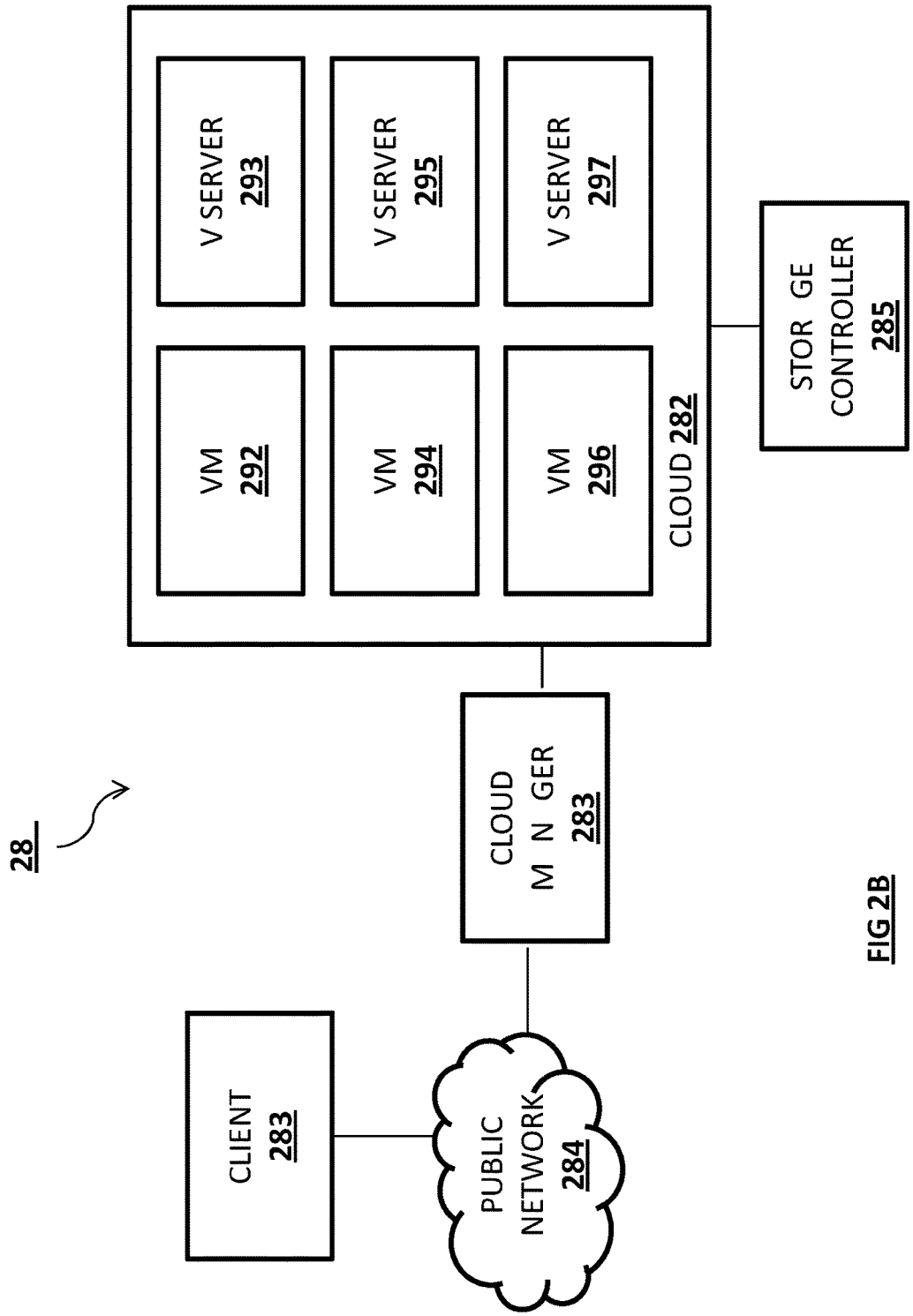
FIG. 2B is a schematic block diagram of an environment including a cloud based storage system that may be added advantageously used with the present disclosure

FIG. 2B shows one or more storage controllers in a cloud environment 280 including one or more storage system(s), according to one or more embodiments. Cloud environment 280 may be a computing environment configured to enable network access (e.g., on-demand) to a shared pool of configurable computing resources (e.g., networks, storage, host servers, applications, services). Furthermore, the cloud environment 280 comprises client cloud manager 281, cloud portion 282, client 283, and public network 284. Cloud portion 282 may include virtual machines 292, 294, and 296. In addition, cloud portion 282 may include virtual servers 293, 295, and 297. Similar to disks 230, there may be a plurality of virtual machines and corresponding virtual servers. Similarly, there may be a plurality of cloud portions, similar to disk array 260. Client 283 may log into a console associated with cloud manager 281 to access cloud 282 (and virtual machines therein) through a public network 284 (e.g., Internet). The client device and/or virtual machines associated therewith provided in cloud environment 280 may be analogous to client 210 of FIG. 2A. The virtual machines, for example, may run applications/application programs associated with the client devices. As a virtual machine may be a software implementation of a "physical machine," the virtual machine may share physical resources with one or more virtual machine.

In one or more embodiments, virtual machines 292, 294 and 296 are configured to store the tree database with variable-length records as described above. The storage controller 285 may be a hardware configured to host one or more virtual servers (vservers) in the cloud 282. In addition, the storage controller 285 may be deployed by the cloud manager 281 and/or a cloud administrator configured to efficiently repair tree databases stored within the virtual machines 292, 294 and 296.

Figure 3A:
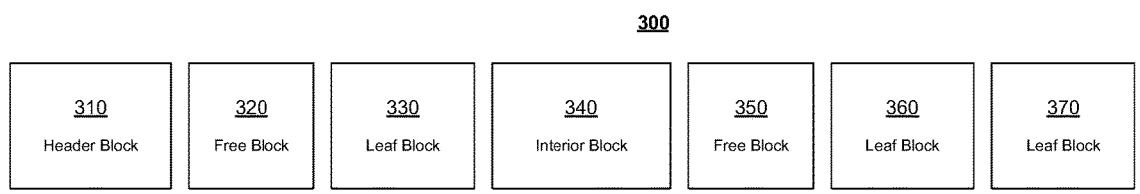
FIG. 3A is a schematic block diagram of a tree database 300 where the individual entries in the blocks are retained in a sorted order.
Figure 3B:
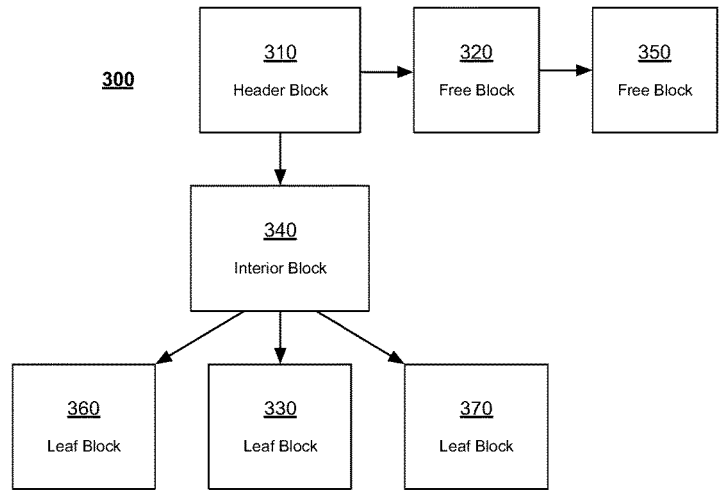
FIG. 3B is a schematic block diagram of the tree database 300 where the database blocks are reorganized to demonstrate their use at runtime.

Referring to FIGS. 3A and 3B, an exemplary schematic block diagram of a tree database 300 as that may be advantageously used with the present disclosure is shown. The tree database 300 is stored in fixed-size blocks. The fixed-size blocks may include single header block 310, free blocks 320 and 350, leaf blocks 330, 360 and 370, and interior block 340. In an exemplary embodiment, each block serves a different function within the database. For example, the single header block 310 can be stored as the first block in the database's storage file. The single header block 310 may contain description of properties of the database, and may indicate where the lookup tree begins. In an exemplary embodiment, unused blocks are not released from the database; instead blocks that lose enough records such that the block becomes useless are moved onto a "free list" to facilitate reusing the block for a different purpose later. Free blocks 320 and 350 represent blocks that are moved onto a "free list." Leaf blocks 330, 360 and 370 contain the actual records stored in the tree database 300. Each record has a lookup key that uniquely identifies the record within the database; and duplicates are not permitted. Furthermore, interior block 340 contains references to leaf blocks, to facilitate searching the tree database 300. FIG. 3A exemplifies an exemplary schematic block diagram of a tree database 300 where within each leaf and interior block, the individual entries in the block are retained in a sorted order. FIG. 3B exemplifies an exemplary schematic block diagram of a tree database 300 where the same database blocks are reorganized to demonstrate their use at runtime rather than their physically unordered storage. In FIG. 3B, where a user requests a specific file from leaf blocks 360, 330, or 370, the header block 310 indicates that the lookup tree for all records begins at interior block 340. The interior block 340 indicates specifically, which leaf block the requested file is located. FIG. 3B also exemplifies a free list associated with the tree database 300. The tree database 300 may comprise a variable-length tree database or a B+ tree database.

Figure 4:
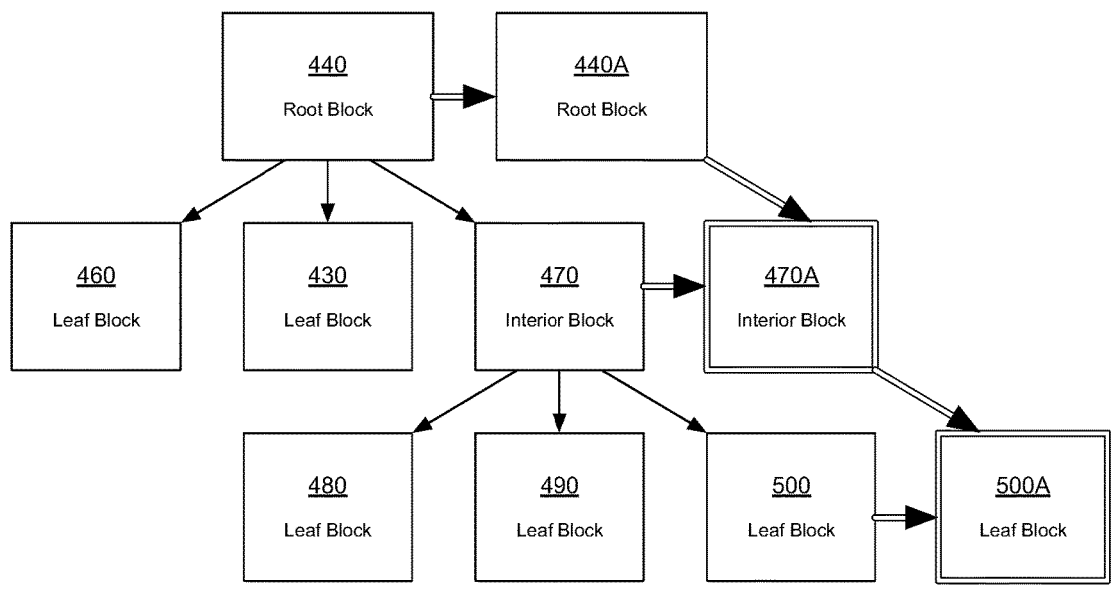
FIG. 4 is a schematic block diagram of a variable-length tree database 400 in accordance with an illustrative embodiment of the present disclosure.

FIG. 4 is a schematic block diagram of a variable-length tree database 400 in accordance with an illustrative embodiment of the present disclosure. A variable-length tree is a variant of the well-known B+ tree, supporting variable-length records and therefore variable fan-out throughout the tree. The maximum size of a record is capped such that any block in the variable-length tree must be able to contain at least two maximum-length records—but no other limitations for record length appear. Because the records in the variable-length tree can be of different sizes, it is not possible to compute or mandate a fixed fan-out for the tree, which means it is not confined to the usual B+ organization rules. Otherwise, the variable-length tree shares some common traits of the well-known B+ tree.

In addition, in variable-length tree, records are added to existing leaf blocks. If a leaf block is too full to accept the new record, it is split into two and then the new record is added to whichever of the two new leaf blocks is appropriate. For example, leaf block 500 may be too full to accept new files; therefore leaf block 500 can be split into leaf blocks 500 and 500A. Splitting a leaf block requires adding a record to the interior block 470, to indicate that the parent now has two leaf block children (leaf blocks 500 and 500A) where previously only one existed. Adding that record to the interior block can require that it be split, as well. For example, interior block 470 may be too full to accept new files; therefore interior block 470 can be split into leaf blocks 470 and 470A. This process continues until the root block 440 is reached. For example, root block 440 may be too full to accept new files; therefore root block 440 can be split into leaf blocks 440 and 440A. If the root block is split, then a new root branch block is created and points to the two new child branch blocks. Removing the last record from a leaf block frees that block. Removing the leaf block from the variable-length tree requires removing its pointer from its parent branch block. Removing that pointer can cause the parent branch block likewise to be freed, and so on up to the root. If the root is a branch block that is reduced to a single pointer, then that root block is freed and its single existing child is promoted to be the new root.

Optionally, one can define a nonzero minimum amount of content for variable-length tree blocks. For example, leaf block 500 may have a minimum content threshold of 1 kilobyte. If removing a record from a variable-length tree block reduces its usage to this minimum value or less, then an attempt is made to merge the block with either its left or right sibling. For example, if leaf block 500A has been reduced to 1 kilobyte or less, the contents of leaf block 500A will attempt merger with the contents of leaf block 500. If the combined this-plus-sibling block will fit in a single block, then the two are merged and the excess block is eliminated, with a corresponding adjustment up the tree towards the root block 440. Where variable-length trees differ from B+ trees in this aspect is in their definition of when a variable-length tree block is too full to hold more content or too empty to stand on its own. B+ tree blocks base this decision entirely on the number of records that a block holds, strictly requiring optimal organization by mandating that all B+ blocks must be half-full-or-better if at all possible. Variable-length tree instead base their decision on sheer bytes-used, and relax the requirement for organizational optimization accordingly. As a result, variable-length tree databases include variable-length records.

Similar to B+ tree databases, variable-length tree databases are susceptible to corruption. For example, a variable-length tree may be corrupted because the implementer left an error in the block-merge or block-split process, such that the index in the variable-length tree was accidentally corrupted while adding or removing a record. In another example, a record-comparison function may be inconsistent in its method for deciding which record should precede which other record, leading to a variable-length tree with out-of-order records. An even more extreme example may include unreadable files being accidentally written over a portion of the database—whether a leaf block, a branch block or even the root block. Some data (such as the records that were explicitly overwritten with unreadable files or that cannot be read) may be irrecoverably lost; this is unavoidable without additional redundancy. Other than redundancy, the goal of a repair mechanism is to recover as much data as possible, ensuring that when complete that the database contains only the records that were able to be extracted from the previously damaged variable-length tree, and that the database now indexes those recovered records legally according to the tree's rules. Further, these repairs are performed as efficiently as possible. Therefore, completely replacing the entire data system as is typical with repairing a B+ tree system is not ideal where databases grow to very large sizes. Furthermore, an extended outage in accessing a mass of important data would be a significant problem for the database's owner.

Figure 5:
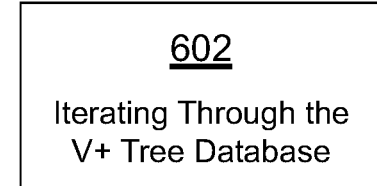
FIG. 5 is a schematic flow diagram of repairing a variable-length tree database 400 in accordance with an illustrative embodiment of the present disclosure.

An exemplary method for efficiently repairing tree databases with variable-length records will now be described with reference to FIGS. 5-8. Referring more specifically to FIG. 5, a schematic flow diagram of method 600 of repairing a variable-length tree database 400 in accordance with an illustrative embodiment of the present disclosure is described herein. The first step 602 of method 600 is iteration through the variable-length tree database exactly once, in block-order. Each block is evaluated and repaired individually, and then the process proceeds to testing the next block in sequence. A process iterates once through the existing variable-length tree database block by block, detecting recoverable leaf blocks, reducing each one to only its legally formatted contents, and writing them back. During this phase, all branch blocks are removed from the database. Afterwards, the second step 604 of method 600 is processing the recovered leaf blocks to ensure that each leaf block represents a disjoint region within the record space; namely that there exists no overlap or duplication in the leaf blocks. This processing can involve splitting some leaf blocks, such that the number of leaf blocks overall might grow. Finally, the third and final step 606 includes a repair process that rebuilds branch blocks as necessary to provide a lookup and organizational index for the recovered leaf blocks.

Figure 6:
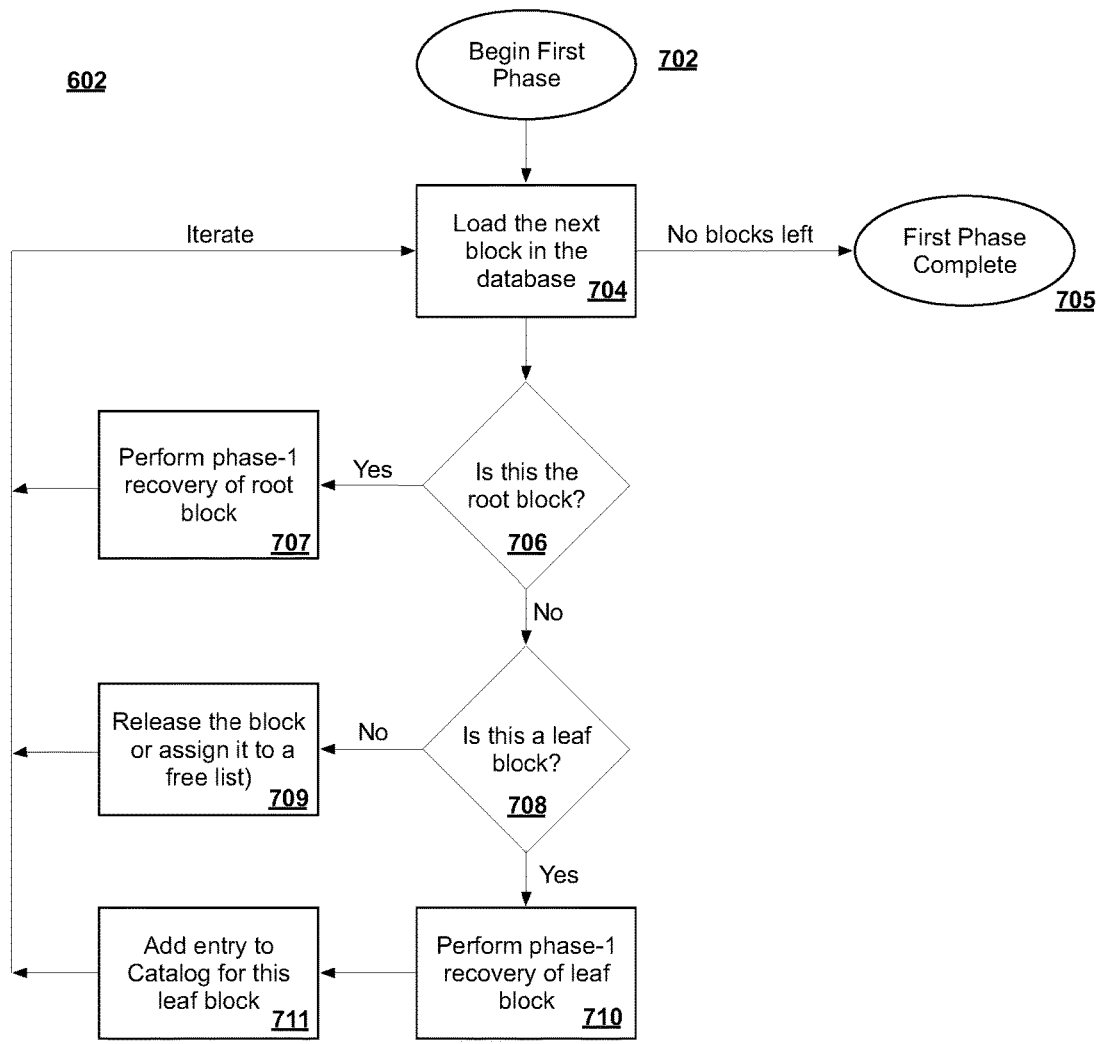
FIG. 6 is an exemplary method for iterating through the variable-length tree database exactly once, in block-order in accordance with an illustrative embodiment of the present disclosure.

FIG. 6 is exemplary method 602 for iterating through the variable-length tree database exactly once, in block-order in accordance with an illustrative embodiment of the present disclosure. Each block is evaluated and repaired individually, and then the process proceeds to testing the next block in sequence. Typically the first block encountered in the iteration is the root block; when encountered, the repair processing is initiated for the root block. Thereafter the process might encounter leaf blocks and other blocks, where each block has its own repair steps. For example, root block 440 (FIG. 4) would be evaluated and repaired initially, following leaf blocks 460, 430, interior block 470, and subsequently leaf blocks 480, 490 and 500.

The root block 440 is expected as the first block in the database; if the first block has been loaded but it does not appear to be a valid root block, the block is nonetheless treated as if it were a root block for purposes of recovery. Similarly, there is exactly one root block; therefore, if a later block appears like a root block but it should not be, the block is not treated as a root block for purposes of repair. Method 602 includes identification 706 and recovery 707 of the root block. This involves ensuring the root block is properly formatted. For example, a properly formatted root block may be required to have any valid signatures or checksums that are necessary, and these are reset to valid values if incorrect. Importantly, some critical fields in the root block are now initialized here at the start of the repair process. For example, the root block's {record count} field may be reset to zero (indicating there are no valid records yet). Furthermore, the root block's {height} field may be reset to zero (indicating there is no lookup tree yet). The root block's {free list} field may be reset to zero (indicating there are no blocks on the list). Finally, the root block's {lookup root} field may be reset to zero (indicating there is no lookup tree yet). When this is complete, the root block is saved to a disk and method 602 iteration continues via step 704. The iteration moves to identification 708 and recovery 709 of a leaf block via 704, and cycles through each leaf block until iteration through the variable-length tree database is complete.

If the next block encountered is neither the single root block 440 nor a leaf block, this recovery step 709 is engaged to remove the block from the database. In an exemplary implementation, the block is removed from the database by formatting the block as a free block and pushing the block to the header block 310, at the database's free list. In other exemplary implementations, the block might simply be released back to the file system. Note step 709 explicitly and intentionally captures all existing interior blocks the blocks that presently form any lookup tree for the database—and discards them. Thus when step 709 is complete, the database will have no lookup tree at all. In step 710, the task of the recovery process is to ensure that the block is fully legally formatted for use in the database, and then to add at 711, an entry to an in-memory Catalog (not pictured) to represent the block. The catalog data structure retains a single entry for each leaf block in the database—specifically, the entire contents of the leaf blocks are not saved. Instead, the catalog data structure only stores the location of the block, what repair phase the block has reached, and the lookup keys for the first and last records within the block.

Because the Catalog only requires the lookup keys for two records in each leaf block, rather than having to retain the full record data for every record in the block, the Catalog is very small. This allows the repair process to typically maintain the catalog entirely in memory during the repair rather than needing to page it to disk as swap space—which in turn makes using the catalog extremely fast. The entries in the catalog are maintained in sorted order. The sort key is primarily the method 600, such that entries whose blocks have finished step 604 processing will always be to the right of all entries that have only finished step 602 processing. Within each step of method 600, the sort key is secondarily ordered by the First Record value. (The Block Number and Last Record values are not part of the sort key for the catalog's entries.)

To validate the leaf block in step 708, method 602 will verify the block's signatures, checksums and other general properties, re-computing any that are incorrect. In addition, method 602 will also iterate through the records in the block—checking each for validity. Any records that are found to be illegally formatted or otherwise invalid, and which cannot be corrected immediately, are removed from the leaf block entirely. As the recovery process iterates through the records in the block, it also checks to ensure the records are sorted correctly; namely, that these records represent siblings in the database, and within each block the records must be maintained in sorted order. If any records are found to be out of sort order, they are re-sorted. In method 602, if there is no corruption at all in a particular leaf block during iteration, then the in-order iteration of the records in the block will be able to quickly validate that the records are valid and the sort order is correct. Therefore, there is no need to perform any actual re-sorting (a computationally expensive step) unless something is actually wrong. Since the database consists primarily of leaf blocks, and since most blocks in the database will be healthy even after a corruption event, this represents a significant performance improvement over prior recovery methods.

When, during implementation of method 602, the records within a leaf block are found to be corrupted, the block is treated as a non-leaf block and is released as a free block into the database. Once the leaf block has been released in this way, any changes to it are committed to disk and an entry to represent the block is added to the in-memory Catalog. The new catalog entry will show that this particular block has just completed step 602 processing, and that it was found to contain a certain range of records as indicated by the first and last lookup keys for the records in the leaf. As each leaf block is updated, the header block's total count of records is increased to match.

Iteration through the entire database proceeds in this way, block by block, until the database has been fully tested. From a performance perspective, the recovery process has now finished a single pass through the database—and the only blocks that were rewritten were those that were corrupt (and thus needed repairs), or blocks that previously formed the lookup tree (which were discarded or moved to a free list). Because the leaf blocks by far represent the bulk of the database, and because none of them were rewritten unless they were damaged, the disk read operations I/O cost of this phase is very low. Likewise, because the Catalog entries are very slim, it is typically formed entirely in memory and therefore represents very little computational cost on the process. At this step 602 of recovery is considered complete.

Figure 7:
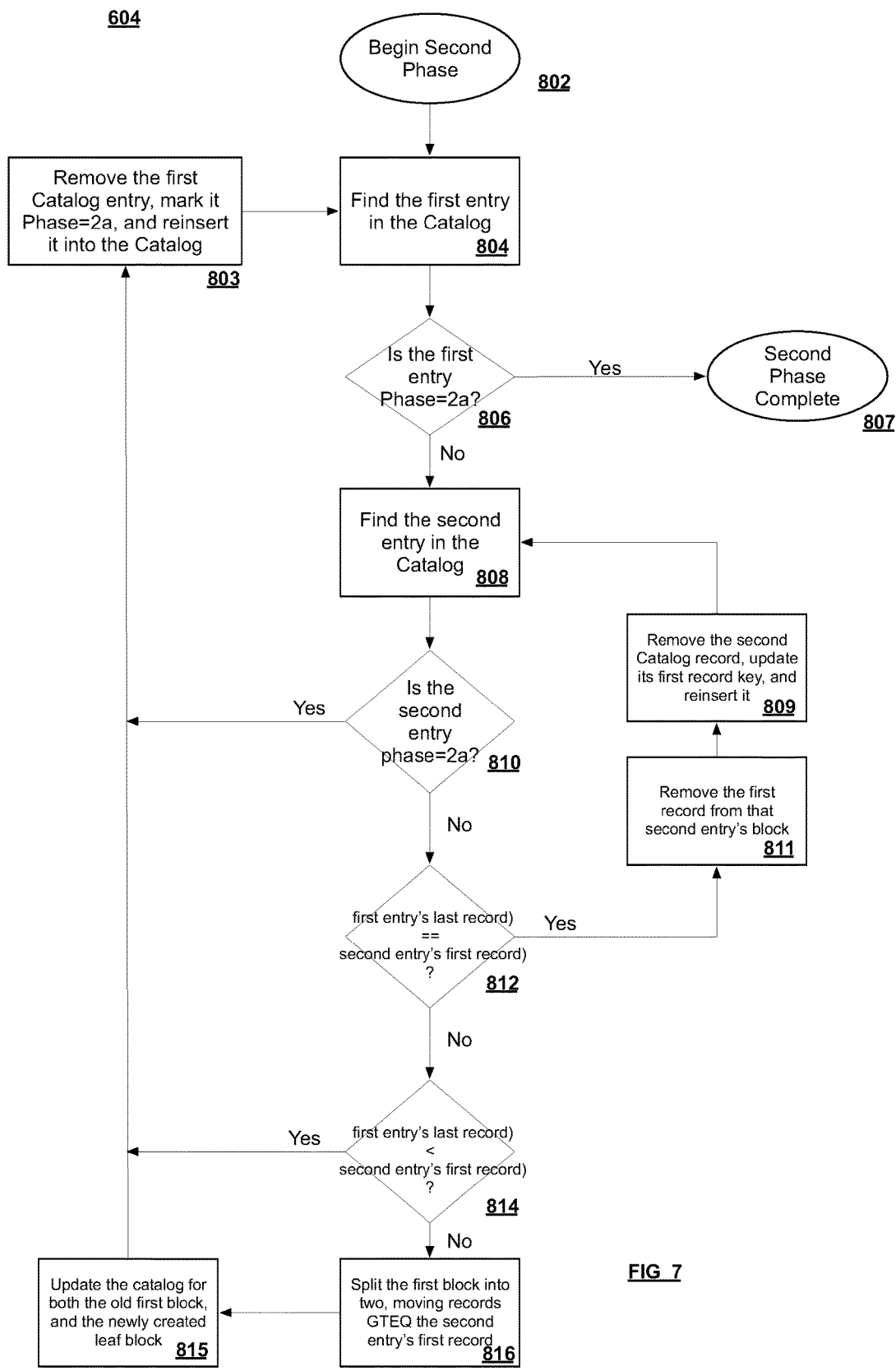
FIG. 7 is an exemplary method for processing the recovered leaf blocks to ensure that each leaf block represents a disjoint region within the record space in accordance with an illustrative embodiment of the present disclosure.

FIG. 7 is exemplary method 604 for processing the recovered leaf blocks to ensure that each leaf block represents a disjoint region within the record space in accordance with an illustrative embodiment of the present disclosure. Method 604 ensures that the leaf blocks separately represent entirely disjoint regions of the collective record space—that there are no duplicate records in the database, nor that any leaf block's range overlaps that of another leaf block. As an initial matter, duplicate records within an individual leaf block were detected and discarded as part of method 602. Method 604 ensures one leaf block's records are not duplicated or otherwise overlapped with records in another block.

Method 604 uses the Catalog to search for overlap or duplication in the data blocks. If overlaps are not found, then the process completes with no disk read operations I/O processing at all. If overlaps are found, then the amount of disk read operations I/O processing required to fix them is a simple function of the number of corrupt blocks. Method 604 operates by iteratively observing the first two entries in the catalog to check for overlaps at step 806 and 808. As the entries in the catalog are sorted primarily by steps of method 600 and secondarily by First Record value, at any time the first two entries in the catalog represent the leftmost remaining blocks in the database that have not yet finished method 604 processing. If the first entry has no conflicts with the second entry then the first entry is removed from the catalog at step 803, updated to mark it as having completed method 604, and then reinserted; the process then repeats, having advanced by one block. Eventually the first entry in the catalog will show that it has already completed method 604 processing, at which point the second will be complete.

If comparing the first entry against the second at step 812 shows that the first entry ends with the exact same record as the second begins, then there is a duplicate record. It could be addressed by removing the duplicate record from either block. For example, step 811 indicates an exemplary embodiment where the first record is removed from the second block. Step 811 may enable a second record being removed from the first block as well. In either case, when the record is removed from that block, the block's entry in the catalog is updated in step 809. The entry for this block remains flagged as first phase (method 602) and not second phase. (method 604), since repairs to the block are not yet finished. Thus when its entry is reinserted into the catalog at 803, this block is likely processed on the next time around.

If comparing the first entry against the second shows that the two blocks have overlapping ranges but not obvious duplicates, then the first block is split into two at step 816. Namely, records that are correctly in the second block are maintained, but all other records are moved into a newly allocated leaf block. The catalog entry for the first block is updated at step 815 (to show a smaller last record entry), and a new first-phase complete catalog entry is added to the catalog for the newly fabricated leaf block. And then second phase processing continues via step 803. When this iteration completes, the leaf blocks that compose the database are entirely disjoint.

Figure 8:
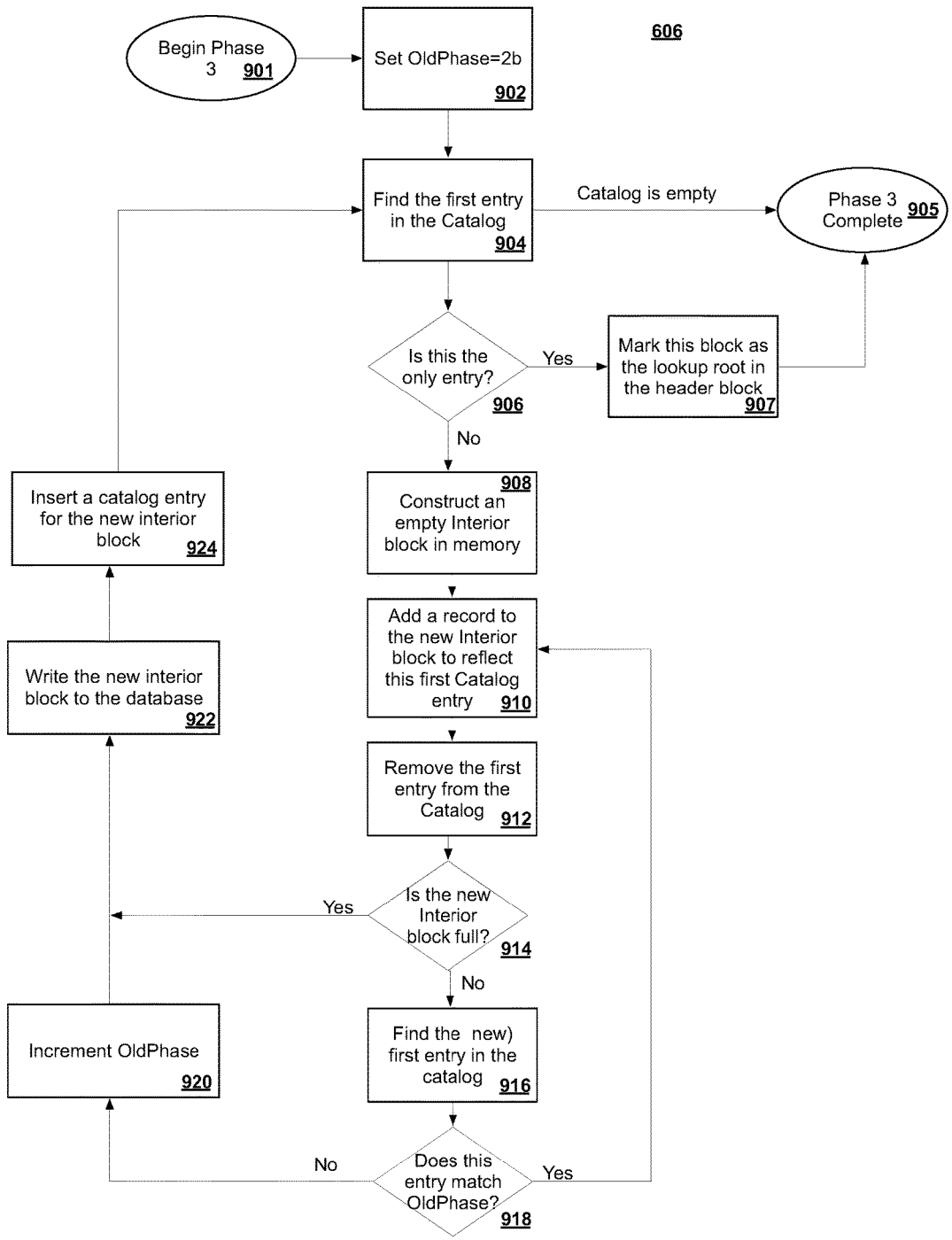
FIG. 8 is an exemplary method for rebuilding branch blocks as necessary to provide a lookup and organizational index for the recovered leaf blocks in accordance with an illustrative embodiment of the present disclosure.

FIG. 8 is exemplary method 606 for rebuilding branch blocks as necessary to provide a lookup and organizational index for the recovered leaf blocks in accordance with an illustrative embodiment of the present disclosure. This final phase of the repair process iteratively builds new interior nodes as a lookup tree above the leaf blocks, reducing the number of records in the catalog by removing each existing entry and adding a corresponding record into a new interior lookup block; when a lookup block is full, an entry for it is added to the catalog. Eventually the catalog is reduced to a single entry, which represents the new root of the lookup tree—at which point the process is complete.

The method 606 begins at step 904, where the first entry in the catalog is located. If this is the only entry, the block is marked as the lookup root in the header block at step 907. Otherwise, an empty interior block is constructed in the memory at step 908. A record is added to the new interior block to reflect the first catalog entry at step 910. The first entry is removed from the catalog at step 912. Next, a determination is made as to whether the new interior block is full at step 914. If the new interior block is full at step 914, a new interior block is written to the database at step 922, and a catalog entry is inserted for the new interior block at step 924. If the new interior block is not full at step 914, the new first entry in the catalog is located at step 916. Then a determination is made at step 918, whether the entry matches the entry submitted prior. If the entry matches the entry submitted prior, method 606 reverts back to step 910 where a record is added to the new interior block to reflect the first catalog entry. If the entry does not match the entry submitted prior, method 606 proceeds to step 920 where the old phase is incremented. Note that, again, the catalog data structure provides all the data needed to build the lookup index—so that the only I/O that happens here is writing out newly formed lookup blocks and eventually updating the database header block to point to the root of the new lookup tree: there is no random I/O, and again the process is fast.

Figure 9:
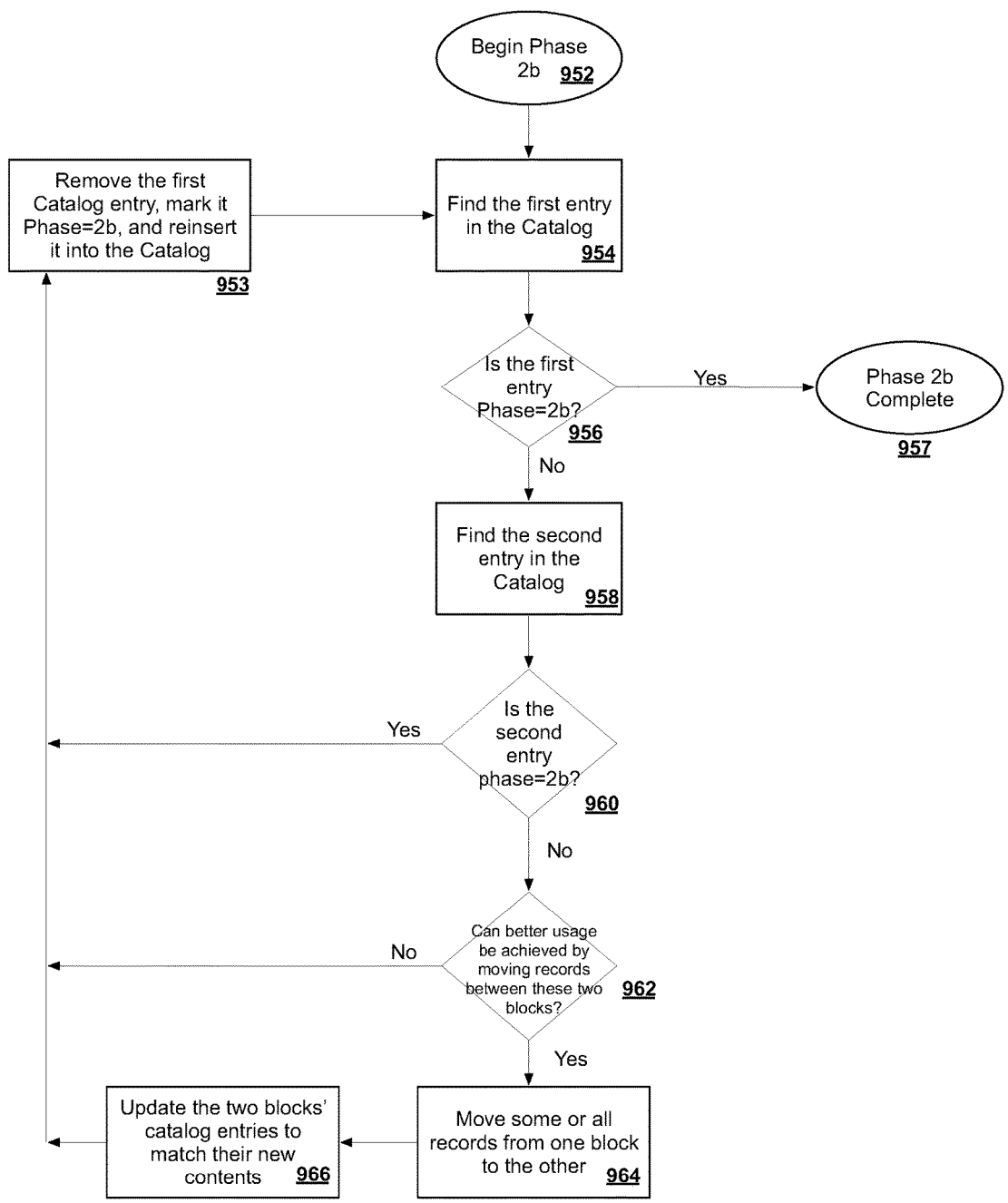
FIG. 9 is alternative to exemplary method 604 for processing the recovered leaf blocks to ensure that each leaf block represents a disjoint region within the record space in accordance with an illustrative embodiment of the present disclosure.

The repair process described here works efficiently for variable-length trees. It can be used for B+ trees as well, but the resulting trees would potentially not be legally formatted (since some blocks might have too many or too few records for strict B+ constraints). This can be addressed either through additional post-repair processing, or by relaxing the constraints about how a legal B+ tree must be formatted. In other words, completely replacing the entire data system as is typical with repairing a B+ tree system is not required. FIG. 9 is an alternative to exemplary method 604 for processing the recovered leaf blocks to ensure that each leaf block represents a disjoint region within the record space in accordance with an illustrative embodiment of the present disclosure. This phase is very similar to method 604, in that it operates entirely against the in-memory Catalog unless problems are actually discovered and need to be corrected. Again it spends its time staring at the first two entries in the Catalog, and if it finds nothing to fix between them then it marks the first entry as having completed alternative second phase, removes it and reinserts it in the Catalog before continuing its iteration. Thus if all goes well, a single in-order pass through the Catalog solves the phase.

The method 950 involves searching for, at 962, and addressing under-utilization of a leaf block, which can be addressed by moving records from one leaf block to its peer. So long as both leaf blocks are filled to the minimum amount that this tree format requires, then there is no problem and iteration can proceed to the next block. If all the records from both leaf blocks would fit into a single leaf block, then that state is preferred—so all records from the second block are moved to the first at step 964. The catalog entry for the second block is removed entirely, and the former block is either released to the file system or pushed onto a free list. The catalog entry for the first block is updated (because its last record and record count have now changed), and method 950 repeats the iteration—noting that the first entry in the catalog is still the focus, but the second entry is now the next leaf block. In this way method 950 coalesces fractionally tiny sibling leaf blocks until a block becomes full, at which point it is decided the first block is adequately full and allows it to be marked phase 2b complete at 957.

In some embodiments, aside from completely merging the contents of the two blocks, some records are moved from the first block to the second or vice versa, to ensure that the blocks legally share their burden of records. If this happens then the catalog entries for both blocks are updated to indicate their new ranges, and then the process continues.

Any number of additional tests could be added to this repair phase, to better balance records among the leaf records—for example, evaluating three or more blocks at a time to better distribute records, comparing the sheer number of records in the database against the number found in each leaf block, and so on. The critical part is that the catalog contains all the data we need to legally format these blocks, and if there are no illegal states that also can be discovered entirely through the catalog with no I/O involved at all—providing optimal recovery.

Embodiments of the present disclosure include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the claims.

What is claimed:

1. A method comprising:
   traversing a tree database, the tree database having variable-length records, wherein the tree database comprises at least one block, detecting at least one recoverable block, reducing the at least one recoverable block to its legally formatted contents, and writing the at least one recoverable block back into the tree database;
   processing the at least one recoverable block to ensure the at least one recoverable block represents a disjoint region within a record space within the tree database; and
   rebuilding branch blocks as necessary to provide a lookup and organizational index for the at least one recoverable block.

2. The method of claim 1, wherein the at least one recoverable block comprises at least one block selected from a leaf block, a branch block, and a root block.

3. The method of claim 1, further comprising detecting at least one non-recoverable block and removing the non-recoverable block from the tree database by formatting the block as a free block.

4. The method of claim 3, further comprising tracking the repair and storing lookup keys associated with the at least one recoverable block and the at least one non-recoverable block in an in-memory catalog.

5. The method of claim 1, wherein ensuring the at least one recoverable block represents a disjoint region comprises comparing the at least one recoverable block with a second recoverable block to ensure there are no duplicate records or overlapping of the at least one recoverable block and the second recoverable block.

6. A computing device, comprising:
   a memory containing non-transitory machine readable medium comprising machine executable code having stored thereon instructions for performing a method of repairing a tree database with variable-length records, wherein the tree database comprises at least one block;
   a processor coupled to the memory, the processor configured to execute the machine executable code to cause the processor to:
     traverse the tree database, detecting at least one recoverable block, reducing the at least one recoverable block to its legally formatted contents, and writing the at least one recoverable block back into the tree database;
     process the at least one recoverable block to ensure the at least one recoverable block represents a disjoint region within a record space within the tree database; and
     rebuild branch blocks as necessary to provide a lookup and organizational index for the at least one recoverable block.

7. The computing device of claim 6, wherein the at least one recoverable block comprises at least one block selected from a leaf block, a branch block, and a root block.

8. The computing device of claim 6, further comprising detecting at least one non-recoverable block and removing the non-recoverable block from the tree database by formatting the block as a free block.

9. The computing device of claim 8, further comprising tracking the repair and storing lookup keys associated with the at least one recoverable block and the at least one non-recoverable block in an in-memory catalog.

10. The computing device of claim 6, wherein ensuring the at least one recoverable block represents a disjoint region comprises comparing the at least one recoverable block with a second recoverable block to ensure there are no duplicate records or overlapping of the at least one recoverable block and the second recoverable block.

11. A non-transitory machine-readable medium having stored thereon instructions for performing a method, the non-transitory machine-readable medium comprising machine executable code which when executed by at least one machine, causes the machine to:
    traverse a tree database, the tree database having variable-length records, wherein the tree database comprises at least one block, detecting at least one recoverable block, reducing the at least one recoverable block to its legally formatted contents, and writing the at least one recoverable block back into the tree database;
    process the at least one recoverable block to ensure the at least one recoverable block represents a disjoint region within a record space within the tree database; and
    rebuild branch blocks as necessary to provide a lookup and organizational index for the at least one recoverable block.

12. The non-transitory computer readable medium of claim 11, wherein the at least one recoverable block comprises at least one block selected from a leaf block, a branch block, and a root block.

13. The non-transitory computer readable medium of claim 11, further comprising detecting at least one non-recoverable block and removing the non-recoverable block from the tree database by formatting the block as a free block.

14. The non-transitory computer readable medium of claim 13, further comprising tracking the repair and storing lookup keys associated with the at least one recoverable block and the at least one non-recoverable block in an in-memory catalog.

15. The non-transitory computer readable medium of claim 11, wherein ensuring the at least one recoverable block represents a disjoint region comprises comparing the at least one recoverable block with a second recoverable block to ensure there are no duplicate records or overlapping of the at least one recoverable block and the second recoverable block.

* * * * *